(12) United States Patent
Aponte Luis

(10) Patent No.: US 11,086,041 B2
(45) Date of Patent: Aug. 10, 2021

(54) WEAPONS AND EXPLOSIVES DETECTOR AND DETECTION METHOD

(71) Applicant: ONTECH SECURITY, SL, La Rinconada Sevilla (ES)

(72) Inventor: Juan Aponte Luis, La Rinconada Sevilla (ES)

(73) Assignee: ONTECH SECURITY, SL, La Rinconada Sevilla (ES)

( * ) Notice: Subject to any disclaimer, the term of this patent is extended or adjusted under 35 U.S.C. 154(b) by 637 days.

(21) Appl. No.: 15/774,245

(22) PCT Filed: Nov. 4, 2016

(86) PCT No.: PCT/ES2016/070784
§ 371 (c)(1),
(2) Date: May 7, 2018

(87) PCT Pub. No.: WO2017/077165
PCT Pub. Date: May 11, 2017

(65) Prior Publication Data
US 2020/0249371 A1 Aug. 6, 2020

(30) Foreign Application Priority Data
Nov. 5, 2015 (ES) .................. ES201531589

(51) Int. Cl.
*F41H 11/136* (2011.01)
*G01V 3/08* (2006.01)
*G06T 1/00* (2006.01)

(52) U.S. Cl.
CPC ........... *G01V 3/088* (2013.01); *F41H 11/136* (2013.01); *G06T 1/0014* (2013.01)

(58) Field of Classification Search
CPC ............ F41H 11/136; G01V 3/08; G01V 3/12
See application file for complete search history.

(56) References Cited

U.S. PATENT DOCUMENTS

| 5,982,180 A | 11/1999 | Bushman |
|---|---|---|
| 9,036,985 B1 | 5/2015 | Falcou et al. |
| | (Continued) | |

FOREIGN PATENT DOCUMENTS

WO   WO2015/044487 A1   4/2015

OTHER PUBLICATIONS

International Search Report, dated Feb. 27, 2017 for corresponding International Application No. PCT/ES2016/070784 with English translation.

(Continued)

*Primary Examiner* — J. Woodrow Eldred
(74) *Attorney, Agent, or Firm* — Intellectual Property Law Group LLP

(57) ABSTRACT

A weapons and explosives detector that comprises at least one controlled magnetic field sensor (10) connected to at least one antenna (11); where this antenna (11) is configured as one electrode; and where the controlled electrostatic field sensor (10) is configured to detected a disturbance in the electrostatic field (3) generated by at least one antenna (11) connected with that sensor (10); and where at least one antenna (11) is prepared in a pole (1); or on the perimeter of the vehicle's (2) bodywork; or in an individual combat weapon; where each sensor (10) is connected to at least one control device (100).

13 Claims, 5 Drawing Sheets

(56) References Cited

U.S. PATENT DOCUMENTS

| | | |
|---|---|---|
| 2003/0107484 A1 | 6/2003 | Gagnon |
| 2005/0285737 A1 | 12/2005 | Kobayashi |
| 2006/0249683 A1* | 11/2006 | Goldberg ............... G01N 21/78 |
| | | 250/370.01 |
| 2009/0182525 A1 | 7/2009 | Schultz et al. |
| 2012/0092019 A1 | 4/2012 | Blum |
| 2014/0077993 A1 | 3/2014 | Hembise |
| 2014/0172374 A1* | 6/2014 | Brady ................ G01N 21/3581 |
| | | 702/189 |
| 2014/0231648 A1* | 8/2014 | Kotter ...................... G01J 3/42 |
| | | 250/339.02 |
| 2015/0114144 A1 | 4/2015 | Bottrell |
| 2018/0113232 A1* | 4/2018 | Tompkins ................ G01V 3/15 |

OTHER PUBLICATIONS

Written Opinion of the ISA, dated Feb. 27, 2017 for corresponding International Application No. PCT/ES2016/070784 with English translation.

* cited by examiner

A-A'

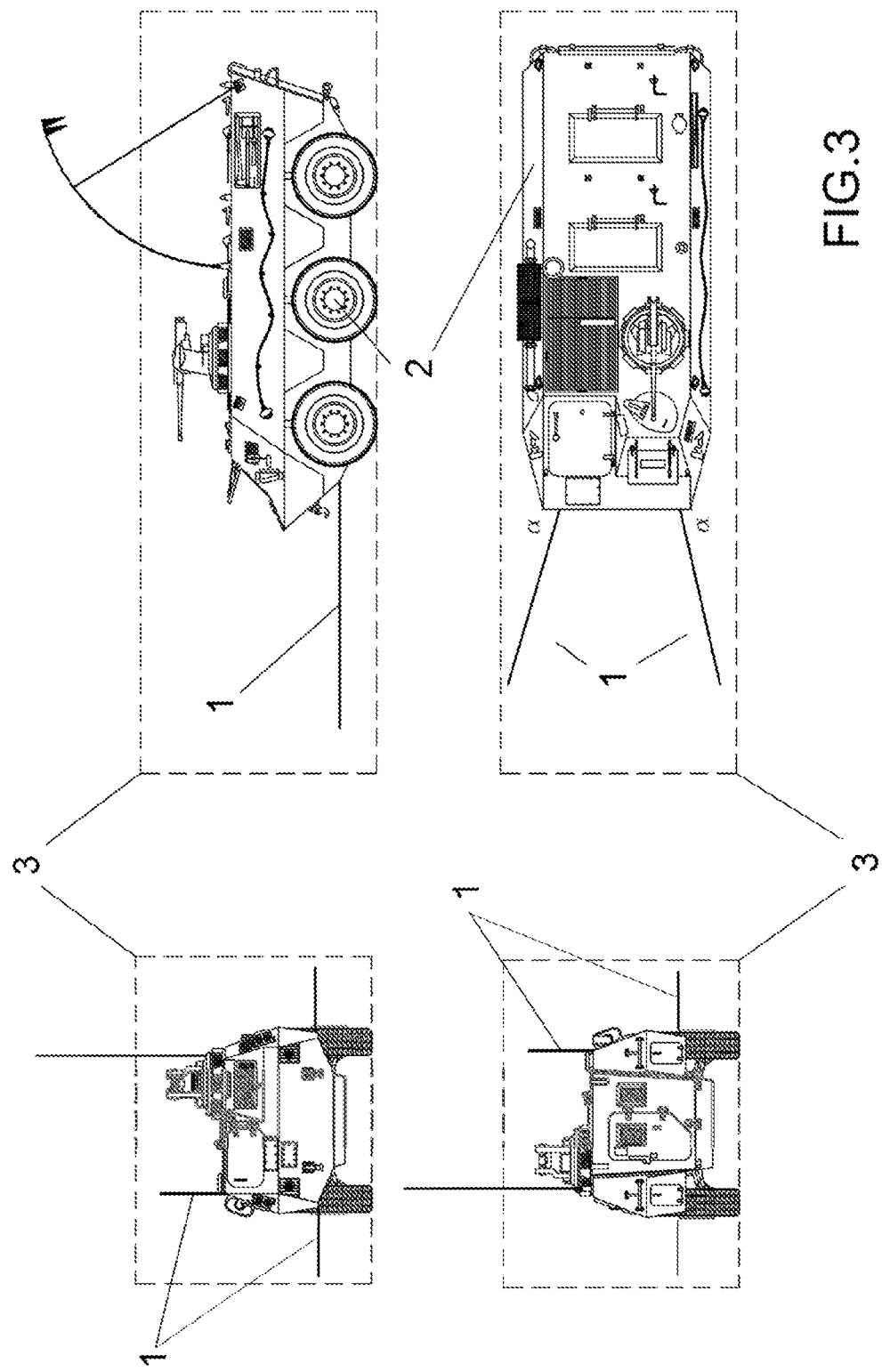

WEAPONS AND EXPLOSIVES DETECTOR AND DETECTION METHOD

CROSS-REFERENCE TO RELATED APPLICATIONS

This application is a U.S. National Phase application, under 35 U.S.C. § 371, of International Application no. PCT/ES2016/070784, with an international filing date of Nov. 4, 2016, and claims benefit of Spanish Application no. P201531589 filed on Nov. 5, 2015, each of which are hereby incorporated by reference for all purposes.

BACKGROUND OF THE INVENTION

1. Field of the Invention

This invention refers to a weapons and explosives detector and a method for detecting weapons and explosives More precisely, this invention refers to IED (Improvised Explosive Devices) detection when vehicles pass by, car bomb detection, land mine detection and/or weapon detection in urban areas and hideouts.

2. Background

The document WO2015/044487 is described in the state of the art. It describes an electrostatic field sensor and a security system for inside spaces that can measure electrostatic fields and their variations through a metal conductor which acts as an antenna or capture probe. This probe is connected to an electronic circuit able to decode these changes in the electrostatic field around the antenna's metallic conductor.

This system allows for measuring disturbances through a single antenna, and from there, deduce the presence of a person, distinguishing them from an animal or thing by measuring the disturbance itself on the single antenna. The system is conceived as a preventative alarm detector, by proximity, by detecting a disturbance in the transmission from the single electrode.

However, this system is conceived as a security detector system and alarm, but it is not outlined as an explosives and weapons detector. For this, the system set out in the WO2015/044487 document would need to be modified so that it can be used in an environment which is constantly under threat and with countermeasures made by the enemy.

In the state of the art, systems for IED detection are outlined such as the documents U.S. Pat. No. 9,036,985 and US2015/114144.

On the other hand, the document US2014/077993 outlines a pivotable block, where at least transmission and reception antennas are assembled for detecting improvised explosive devices, which are positioned in such a way that they illuminate at least one, same space, and a detection camera to confirm that it is facing the illuminated area through these transmission and reception antennas in such a way to be able to create an image of the area, as well as methods to control the direction of this pivotable block, which provoke a movement of the block, generating an examination of a part of the space with these detection methods.

The US2009/182525 document also outlines a method that can include IED detection by detecting the presence of an IED's non-linear electronic component. The presence of the IED's non-linear electronic component can be detected by illuminating the device with a high-power microwave signal that contains multiple electromagnetic radiation radio frequencies and the reception of all and/or difference in frequency components that are made by interacting the signal illumination with a non-linear IED component and subsequently radiated.

In general, comparing the state of the art, using an electrostatic sensor that detects the disturbances of the electrostatic field using a single antenna, configured as an electrode and prepared in such a way that it considerably simplifies the detection, because with one single antenna, any disturbance can be detected and profiled, regardless of how the threat is made up (the material it is made with is not important) meaning greater security and dependability for detecting threats in an environment that, by definition is ever-changing and requires a fast, efficient, cheap detection, allowing for friend/enemies to be identified on the battle field while being resistant to the electronic countermeasures that could be created by the enemy.

SUMMARY OF THE INVENTION

The purpose of this invention is a weapons and explosives detector and a method for detecting weapons and explosives. More precisely, this invention refers to IED (Improvised Explosive Devices) detection when vehicles pass by, car bomb detection on these vehicles, land mine detection and/or weapon detection in hideouts or other places.

The weapons and explosives detector and invention method are more precise (it can detect any disturbance from any type of threat) and easy to implement (it is based on using at least one antenna that consists of one single transmitter-receiver electrode) than those outlined in the state of the art. Therefore, it is implemented by measuring the disturbances made in an electrostatic field due to the presence of any object in its vicinity.

The weapons and explosives detector of the invention includes at least one electrostatic sensor able to measure the disturbances generated by people, objects or animals around an antenna, which is, in turn, a transmitter of an electrostatic field and which detects the disturbances that are made in the transmitted field. This antenna, generally an electrode, transmits the electrostatic field in a routed sense, in other words, it can transmit toward a space around it and not omnidirectionally, shielding the part that is not wanted. That's why the provision of this antenna is different for each use, given that each antenna is free to detect a disturbance in the electrostatic field generated around it, despite being connected to a single circuit. Thanks to the provision of the antenna(s), it will be possible to define a "covered" physical space by the transmitted field, depending on the physical structure where it is implemented (modifying the provision of the different elements for each specific case) simply and without any limitations.

These advantages are reached with the different aspects outlined in the independent claims and are included here as a reference. Other particular implementations of the invention are outlined in the dependent claims, which are similarly incorporated here as a reference.

Thanks to the weapons and explosives detector outline in these attached claims, a weapons and explosives detector and method for detecting weapons and explosives is obtained. More precisely, this invention refers to IED (Improvised Explosive Devices) detection when vehicles pass by, car bomb detection, land mine detection and/or weapon detection, by detecting a person approaching and/or profiling a strange element that could itself be considered as a threat.

Throughout the description and the claims, the word "comprises", and its variants do not intend to exclude other technical characteristics, additives, components or steps. For experts in the field, other objects, advantages and characteristics of the invention will derive in part from the description and in part from the practice of the invention. The following examples and drawings are provided by way of illustration and are not intended to restrict the present invention. In addition, the present invention covers all possible combinations of and preferred implementations indicated here.

BRIEF DESCRIPTION OF THE DRAWINGS

A brief description is given below of a series of drawings that help to better understand the invention and that are expressly related to an implementation of said invention that is presented as a non-limiting example.

FIG. 3. Diagram of weapons and explosives detector of the invention for IED detection and/or car bombs.

DETAILED DESCRIPTION OF SPECIFIC EMBODIMENTS

Figure 1:
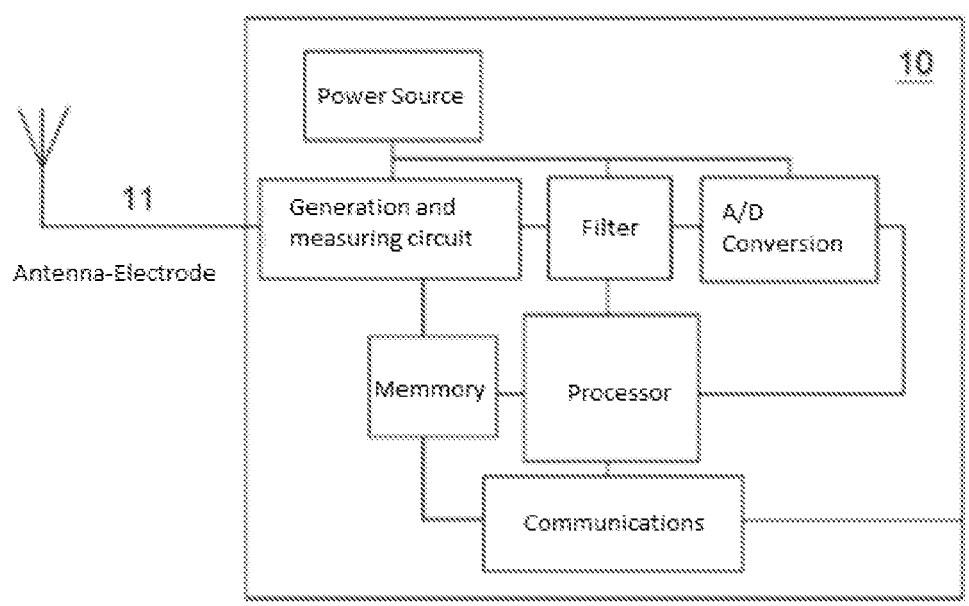
FIG. 1. Diagram of sensor blocks (10) in accordance with the invention.

An aim of the invention is a weapons and explosives detector that comprises different practical implementations, as shown below, each of the specific implementations of the parts that make up the weapons and explosives detector concerning the invention are listed.

The electrostatic field sensor (10) is a solution based on the sensor outlined in WO2015/044487 but improved for its use as a weapons and explosives detector.

However, in illustration 1, an alternative to this sensor is outlined. As can be appreciated in illustration 1, the electrostatic field sensor (10) comprises an antenna (11) that consists of one single electrode, which is, at the same time, transmitter and receiver (transmitter-receiver electrode) and is the antenna (11) used in each every one of the implementations that are put forth in this invention, albeit with different physical configurations and connectivities that can improve their functionality. It must be considered that several antennas can coexist in parallel in some implementations, albeit, each of them maintains the particularity of being a transmitter and receiver at the same time.

However, the controlled electrostatic field sensor (10) also involves a generation circuit and field measurement, preferably a tuner circuit with a work frequency of less than 5 MHz which comprises an RLC circuit and a phase stabilizer circuit. The signal received by the antenna, after measuring, goes through a filtration state and subsequently, this signal goes through a digital-analogue converter, which in turn is connected to a processor configured to detect the variations in the electrostatic field, creating a three-dimensional map with these variations, being able to define the volume and density of the object that has generated the variation. This processor, in turn, is connected to a radio frequency circuit that transmits an encrypted signal to a control device (100), which is external to the sensor itself (10) as can also be seen in illustration 5. The circuit is completed with a data storage memory.

Mine Detection

Figure 2A:
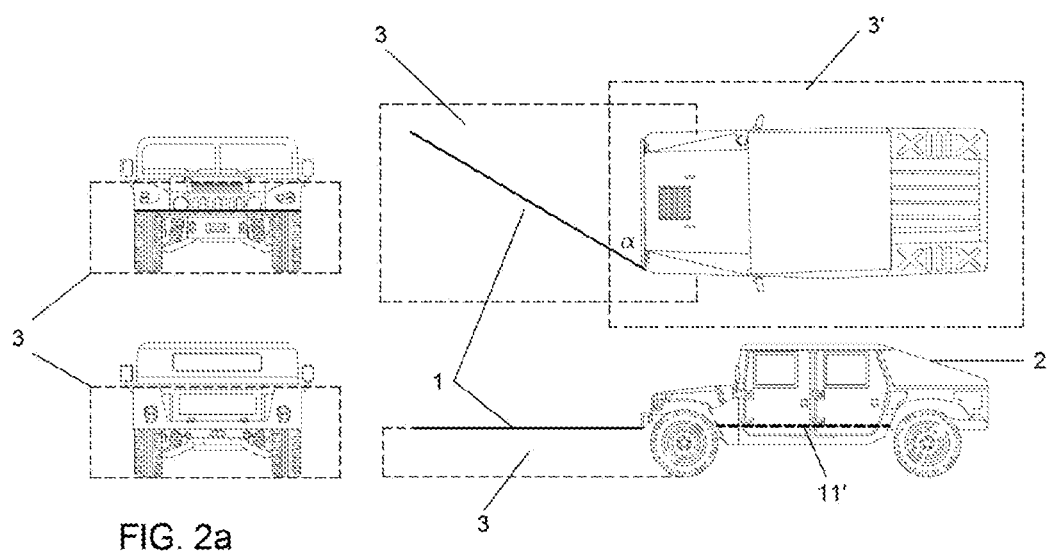
FIG. 2. Diagram of weapons and explosives detector of the invention for detecting mines in vehicles (FIG. 2a) or manually (FIG. 2b).
Figure 2B:
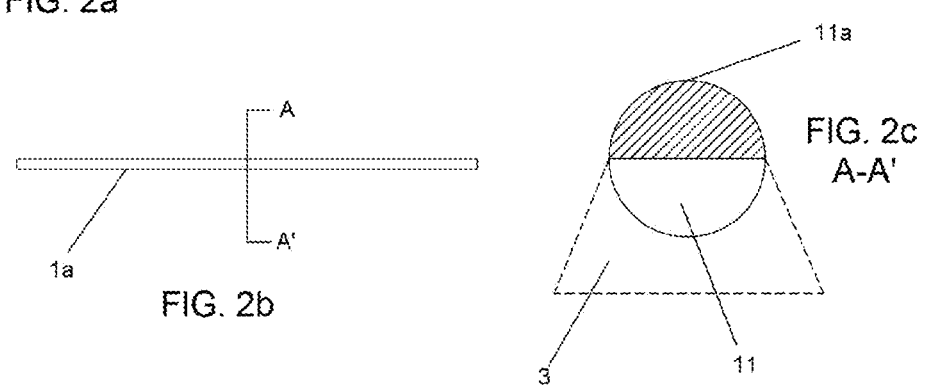
Figure 2C:
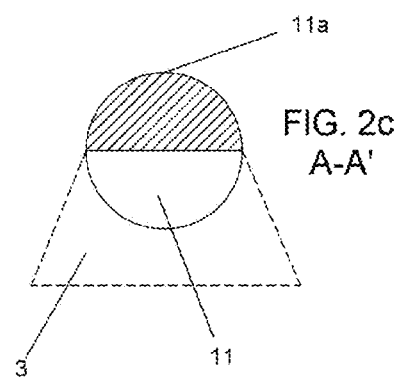

As can be seen in illustration 2, there are two potential devices for detecting mines, a vehicle configured for detecting mines (FIG. 2a) and a device for individual or manual use (FIG. 2b).

Experts in the field know that there are several types of land mines that are generally placed into two large groups: anti-tank mines and anti-personnel mines.

The anti-tank mines, in turn, are different in type depending on how they are activated, although the most common ones are magnetically activated, which respond due to the vehicle's proximity, and those that are activated through contact, either by touching them or by easing the pressure on the activation mechanism.

On the other hand, generally, the anti-personnel mines, activated through contact or pressure on them and their manufacturing materials vary considerably, with them preferably being plastic to avoid being detected, or metal, in the case of the older ones.

Therefore, the variety of threats means that the methods used to detect them must be flexible enough to detect any material in any position. So, the mine detection vehicle comprises an attachment at the front which houses at least one antenna (11) connected to at least one sensor (10).

In a favored implementation, shown in illustration 2a, this attachment at the front only consists of at least one pole (1) attached to the vehicle (2) in such a way that it can be retractable or telescopic, because it only needs to be unleashed in the event of combat, and not, for example, when the vehicle is the base or the barracks.

In the implementation in illustration 2a, the favored implementation is shown where the pole (1) forms an angle (a) at 45° with the front of the vehicle (2) given that, in this way, it's possible for the pathway of the roadside and its ditches to be controlled in one sweep. However, other solutions with the pole making other angles with the front of the vehicle could be considered depending on each use or specific application.

The antenna (11) will be housed inside the pole (1) in such a way that an electrostatic field (3) will be created around the pole (1) and directing the lower direction, using the shield of the upper part of the pole (1) (see illustration 2c, section A-A at the front of the pole). By doing so, the field is exclusively facing the ground, which the area where the anti-tank or anti-personnel mines are buried. In the same way, it can be seen in the illustration how there is also a perimeter antenna (11) which can create a second field (3) which is on the perimeter with regards the vehicle (2) itself.

In the same way, a manual device can be seen in illustration 2b for infantry use, which is essentially a pole (1a) made with light materials, for example, plastic or another non-conductive electronic polymer, and that can be equally extended for individual use. As with the pole (1) on the vehicles (2), the individual pole (1a) will be shielded (11a) on all sides bar one, which is the antenna itself (11) (see illustration 2c, section A-A front of the pole), in such a way that the electrostatic field created inside the pole (1a) by the antenna (11) is facing the open space, creating an electrostatic field (3) which can detect the disturbance in its region or area of influence to warn the soldier carrying it of the presence of a disturbance, which could not only be a mine, but also an IED, or even the presence of weapons buried in hideouts or any other type of disturbance that could be characterized by the sensor (10) that the antenna (11) is connected to from the individual pole (1a).

IED Detector and Car Bombs

In applications for detecting IED and car bombs, it is based on the implementation of mines shown in illustration 2a and the number of poles (1), because to detect IED and car bombs, a 360° protection of the vehicle is required.

Therefore, in a favored implementation, as shown in illustration 3, the vehicle (2) comprises a first antenna (11) that surrounds the vehicle and that creates a first electrostatic field (3) close to the vehicle's own bodywork, in such a way that the closest of threats can be detected and profiled, such as people approaching, or foreign objects attached to it.

On the other hand, like in illustration 2a, the vehicle with the system configured for detecting IED will compose, preferably multiple poles (1), the same type of those indicated for detecting mines, but which, given the special threat that IEDs pose, they must also generate an electric field (3) of 360° around the vehicle, even in the upper section, because many of these devices are located in urban areas on windows and ledges or even in areas with trees on branches high above. Therefore, detection of these devices must be done with full coverage of the vehicle (2). Each of the antennas (11), preferably one per pole (1), will be connected to at least one sensor (10) placed inside the vehicle (2).

Preferably, the poles (1) will also form a 45-degree angle (α) with the front of the vehicle (2) like the one in illustration 2a, so that it can cover the filed with better coverage on the pathway and the roadsides.

In the same way, it must be remembered that the poles (1) of the implementations shown in FIGS. 2a and 3 cannot only have a variable angle (α) (understanding this variable angle, both being in a fixed position at a specific angle and changing, as even the pole (1) can be mobile for sweeps) but also its length must be so to be able to detect at an appropriate security range, which could be, in a favored implementation of 10 meters, but it must never be under the total length of the vehicle (2) and which must preferably be at least double the total length of the vehicle carrying it.

Weapons and Explosives Detector Implemented on an Individual Weapon

Besides the individual pole (1a) in illustration 2b for detecting mines or hideouts with weapons, the same individual pole (1a) can be used to detect other types of threats, such as, detecting the presence of people that are hiding in buildings or in hidden places.

Figure 4:
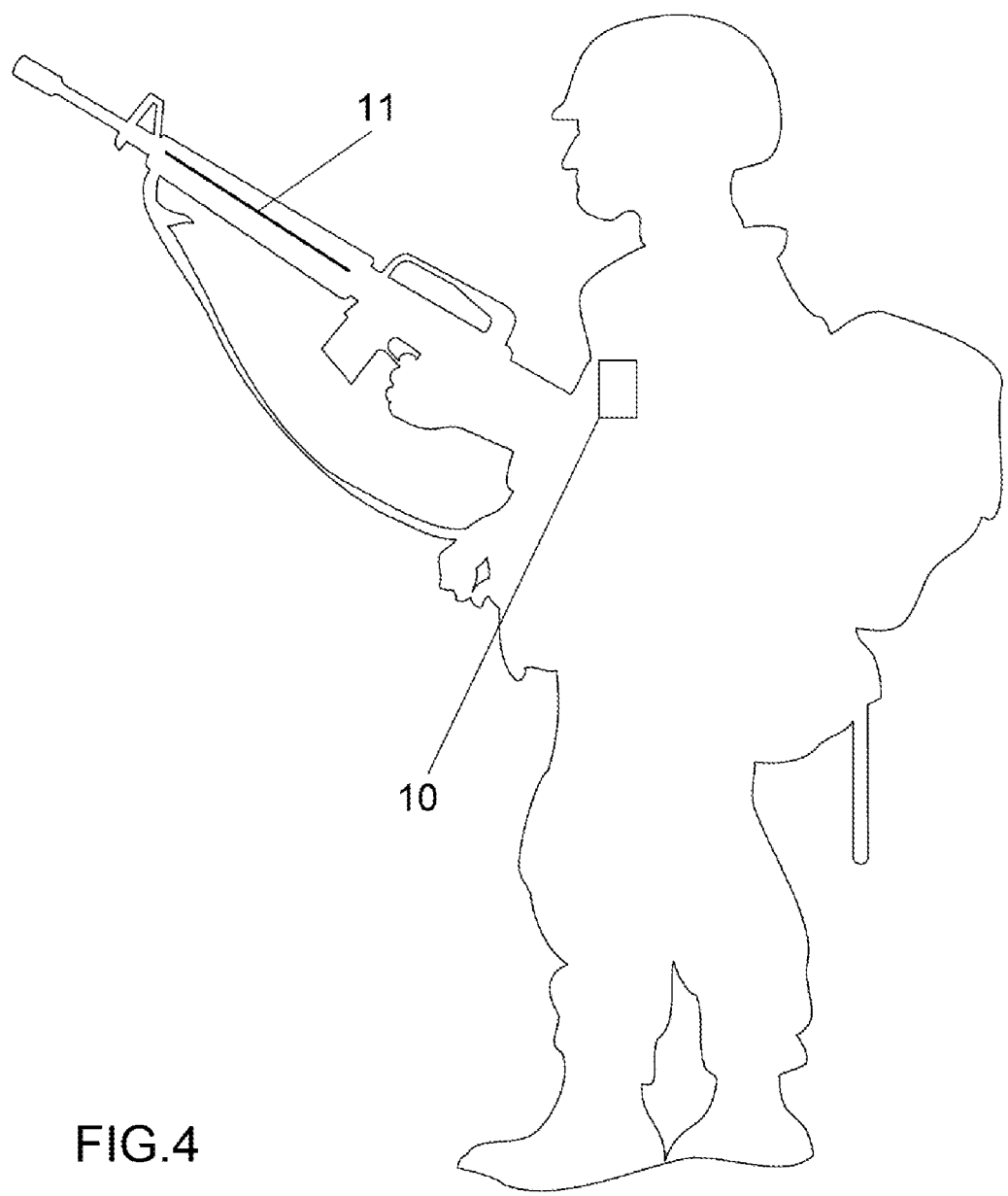
FIG. 4. Diagram of weapons and explosives detector of the invention, implementing an individual weapon.
Figure 5:
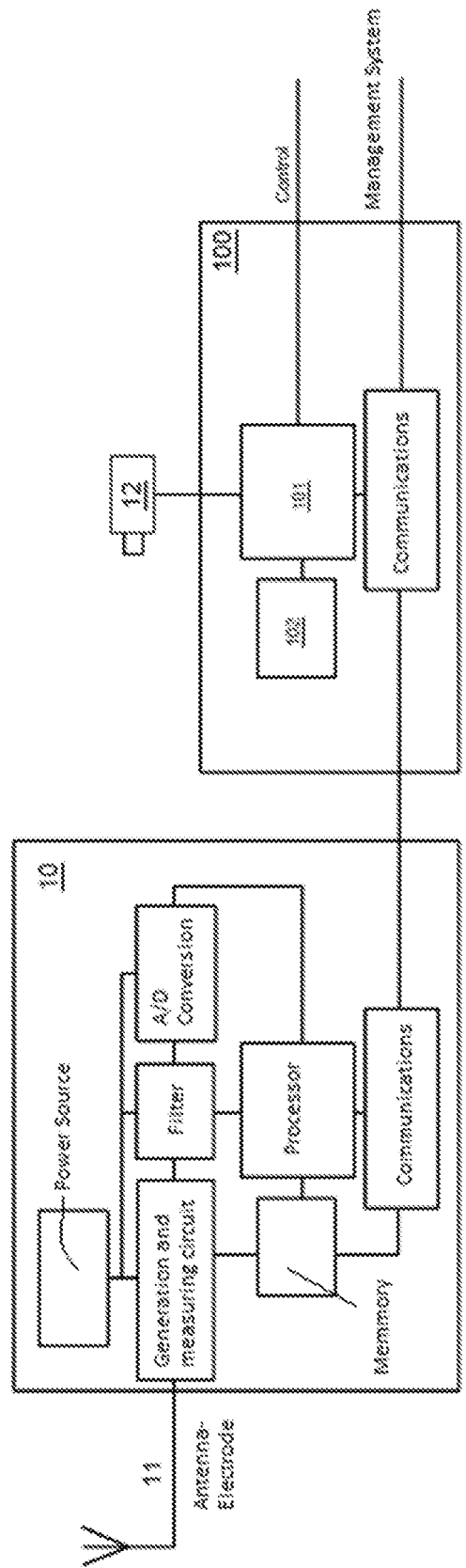
FIG. 5. It shows the block diagram of a control device (100) in accordance with this invention.

In another implementation, shown in FIG. 4, the antenna (11) can be included in the soldier's individual weapon itself, along with the sensor (10) connected to a control device (100) which will warn the soldier of the threat and even, identify the friend/enemy, which is very important in this type of combat.

Control Device (100)

For all the implementations, all the sensors (10) are connected to a control device (100) that comprises: one or more processors (101); a memory (102); and one or more programs where the program(s) are stored in the memory (102) and configured to be executed by, at least, the processor(s) (101), including the instruction programs for: (i) profiling a disturbance detected by at least one sensor (10); (ii) focusing at least one camera (12) on the at least one sensor's (10) operational area with a detected disturbance; (iii) monitoring the operational area with a sensor (10) with a detected disturbance; (iv) generating a control signal and (v) notifying a combat management system or BIMS (Battlefield Information Management System).

The control device (100) is the same for all implementations and it can be a specific electronic device included in the soldier's infantry combat equipment or even be installed in a combat vehicle's engine itself, or be any other electronic device, if it fulfils the individual features indicated for each implementation.

In the different practical implementations of the invention, the control signal generated by the device (100) can vary. For example, the control signal is generally an alarm/warning that can also be associated to a friend/enemy identification signal using the combat management system or directly, with an automatic weapons stations to automatically engage fire, if the combat management system (which obviously includes the force commander on the ground or the soldier himself) identifies the threat as hostile or presumably hostile. Consider that, in the IED detection implementations, the IED can be automatically destroyed on detection before it explodes and just after being identified, without giving the enemy any time to react.

What is claimed is:

1. A system comprising a weapons and explosives detector and an automatic weapon, the system comprising at least:
   a camera (12);
   a controlled magnetic field sensor (10) connected to at least one antenna (11);
      where the at least one antenna (11) is configured as a single electrode; and
      where the controlled electrostatic field sensor (10) is configured to detect a disturbance in an electrostatic field (3) generated by the at least one antenna (11) connected with the controlled magnetic field sensor (10);
   wherein the at least one antenna (11) is mounted on a pole (1), or on a perimeter of a vehicle's bodywork (2), or on an individual combat weapon; and
   wherein the controlled magnetic field sensor (10) is connected to a control device (100) which comprises:
   one or more processors (101);
   a memory (102); and
   one or more programs in which the one or more programs are stored in the memory (102) and configured to be executed by the one or more processors (101), including instruction programs for:
   profiling a disturbance detected by the at least one antenna (11) connected to at least one controlled magnetic field sensor (10);
   focusing the at least one camera (12) on at least one area where the at least one antenna (11) connected to the at least one sensor (10) has detected the disturbance;
   monitoring by the camera (12) at least one area where the at least one antenna (11) connected to the at least one sensor (10) has detected the disturbance;
   generating a control signal; and
   notifying a combat management system;
   and wherein the control signal comprises the following signals: activating an alarm; pointing the automatic weapon towards an area where the at least one antenna (11) connected to the at least one controlled magnetic field sensor (10) has detected the disturbance; and automatically shooting the automatic weapon towards an area where the at least one antenna (11) connected to the at least one sensor (10) has detected the disturbance if it is considered an enemy in the combat management system.

2. The system, in accordance with claim 1, where the at least one antenna (11) is located on at least one telescopic pole (1).

3. The system, in accordance with claim 1, where a pole (1) is attached to a vehicle (2).

4. A weapons and explosives method implemented on a system according to claim 1, the method comprising the steps of:
- profiling a disturbance detected by at least one antenna (11) connected to a controlled magnetic field sensor (10);
- focusing at least one camera (12) on at least one area where the at least one antenna (11) connected to at least one controlled magnetic field sensor (10) has detected a disturbance;
- monitoring by the camera (12) the at least one area where the at least one antenna (11) connected to at least one controlled magnetic field sensor (10) has detected the disturbance;
- generating a control signal;
- notifying a combat management system; and
- identifying a threat as a friend or an enemy in the combat management system.

5. The method, in accordance with claim 4, comprising a step of extending from a vehicle or from an individual, at least one pole (1) with at least one antenna (11) inside it.

6. The method, in accordance with claim 5, comprising a step of automatically pointing a weapon at the area where the disturbance has been detected and shooting the weapon if the disturbance has been identified as an enemy.

7. The system, in accordance with claim 2, where a pole (1) is attached to a vehicle (2).

8. The weapons and explosives method of claim 4, wherein the at least one antenna (11) of the detector is located on a telescopic pole (1).

9. The weapons and explosives method of claim 4, where a pole (1) of the detector is attached to a vehicle (2).

10. The weapons and explosives method of claim 8, where the pole (1) of the detector is attached to a vehicle (2).

11. The weapons and explosives method of claim 5, wherein the at least one antenna (11) of the detector is located on a telescopic pole (1).

12. The weapons and explosives method of claim 5, where the pole (1) of the detector is attached to a vehicle (2).

13. The weapons and explosives method of claim 11, where the pole (1) of the detector is attached to a vehicle (2).

* * * * *